Apr. 17, 1923. 1,452,087

W. MARK ET AL

TRAP FOR MICE, RATS, OR OTHER VERMIN

Filed Aug. 22, 1921

Inventors:
William Mark and F. J. Parker,
by Emil Bonnelycke, Attorney.

Patented Apr. 17, 1923.

1,452,087

UNITED STATES PATENT OFFICE.

WILLIAM MARK, OF WETHERAL, NEAR CARLISLE, AND FREDERIC JOHN PARKER, OF CARLISLE, ENGLAND, ASSIGNORS TO THE MARK PATENT COMPANY, LIMITED, OF WESTON, BATH, ENGLAND.

TRAP FOR MICE, RATS, OR OTHER VERMIN.

Application filed August 22, 1921. Serial No. 494,157.

(GRANTED UNDER THE PROVISIONS OF THE ACT OF MARCH 3, 1921, 41 STAT. L., 1313.)

*To all whom it may concern:*

Be it known that we, WILLIAM MARK, of Great Corby, Wetheral, near Carlisle, in the county of Cumberland, England, and FREDERIC JOHN PARKER, of Carlisle aforesaid, both subjects of the King of Great Britain and Ireland, have invented certain new and useful Improvements in Traps for Mice, Rats, or Other Vermin (for which we have made application in England Aug. 19, 1920, No. 24,172, granted Nov. 21, 1921, Patent No. 171,493), of which the following is a specification.

This invention relates to traps for mice, rats, or other vermin, of the "break-back" type, involving the provision of a trigger or platform which is tilted by the setting of a cranked skeleton metal jaw under spring action and so arranged with relation to the bait hook or the like that on the animal passing onto the platform, the latter is depressed, the jaw released, and the animal pinned between the jaw and the base of the trap or between the jaw and the platform.

According to the present invention, we have provided a very simple and efficient trap of the type above specified in which the body or base of the trap is formed either entirely of sheet metal or entirely of wood or any other suitable material or a combination of wood or other suitable material and metal as may be found most convenient.

In traps of previous construction it has been necessary for setting, to move the jaw through an angle of approximately 180°, whereas, by the present invention, the trap is set by the movement of the jaw through an angle of approximately 90° to a position slightly past the dead center, this movement producing the upward tilting of the platform and causing the spring to retain the jaw and platform in set condition until tripped by the animal depressing the platform; further, the same spring which sets the trap moves the jaw to trapping position in the same direction as that in which said spring is released.

Other features of the invention are hereinafter described and specifically pointed out in appended claims, reference being made to the accompanying drawings in which:—

Figure 1:
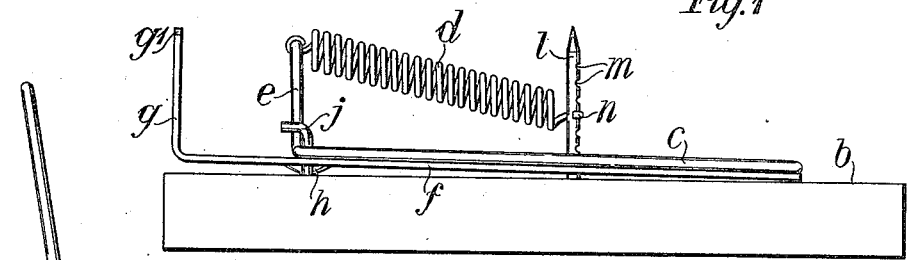
Fig. 1 is a side elevation of the trap in normal position.
Figure 2:
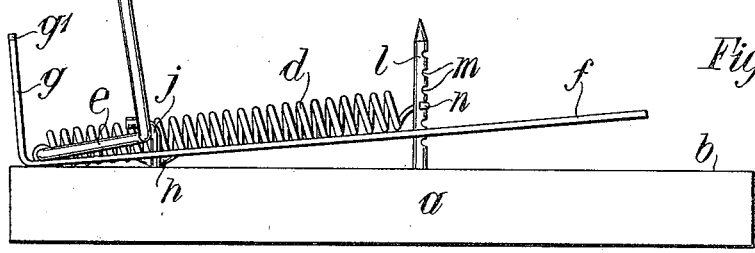
Fig. 2 is a similar view with the parts in set position.
Figure 3:
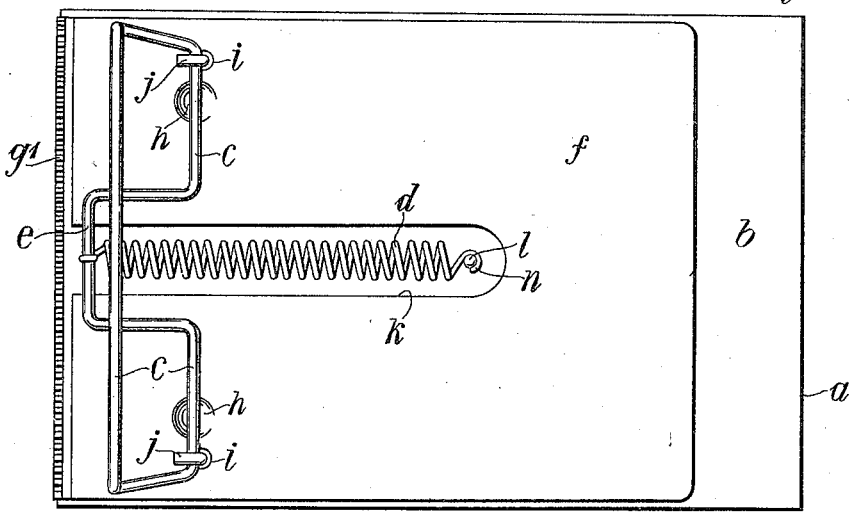
Fig. 3 is a plan view of Fig. 2.

The improved trap shown in the drawings comprises a base $a$ having a substantially flat upper surface $b$ and is what is known as "self-setting," being set by moving the skeleton jaw $c$ to a position slightly past a dead centre, as shown in Fig. 2, where it is held by a coiled spring $d$ connected to the central cranked part $e$ of said jaw, the same spring moving the jaw to trapping position when released, as shown in Fig. 1. The crank, however, is at such an angle that it is only necessary to move the jaw to a position substantially at a right angle to the base (Fig. 2) instead of right over or parallel to the base as customary. The spring $d$ is also attached to the front of the base or, as shown, to the bait hook or spike $l$ and pulls the jaw to trapping position in the same direction as it is relaxed, whereby the pull or pressure on the jaw and the holding power are considerably increased.

$f$ designates the tiltable platform having its rear end upturned as at $g$ and provided with serrations $g^1$ to deter the animal from entering the trap at this end.

The platform has protuberances $h$ forming pivots and resting on the base $a$; and said platform is also provided with apertures $i$ for the passage therethrough of hooks $j$ forming bearings for the jaw $c$, and is further provided with a cut away part $k$, through which the bait hook $l$ passes and which permits proper movement of the spring $d$ when the trap is set. This cut away part or slot $k$ is formed longitudinally of the platform and substantially along the median line thereof; and since the spring $d$ is disposed directly above and in line with said slot, the spring may likewise be regarded as situated along the median line of the platform, the arrangement being such, therefore, that the pull of the spring is distributed evenly throughout the jaw.

Greater sensitiveness of the trap is also provided for by the regulation of the height of the spring above the level or surface of the tilting platform, for which purpose one side of the bait hook $l$ is provided with teeth, serrations or the like $m$ with which engages a loop $n$ at the end of the spring; or a similar result may be obtained by suitably adjusting the height of the bait hook to which the spring is attached above the surface of the platform.

From the above description it will be seen that the act of setting the jaw $c$ causes the platform $f$ to be tilted and normally held in such tilted position by rocking it about its pivots $h$ and by the crank $e$ pressing on the platform to the rear of said pivots; but when depressed by the animal, the platform is rocked about the pivots in the reverse direction and lets off the jaw, the spring $d$ bringing it sharply to trapping position.

What we claim as our invention and desire to secure by Letters Patent of the United States is:—

1. A vermin trap, comprising as base; a tilting platform pivotally mounted thereon; a hingedly-mounted, skeleton jaw provided with a central crank and having a restricted rocking movement of approximately 90° slightly past the dead center to bear upon the platform and thereby set the trap; a vertical member attached to the base at a point substantially in the median line of the platform; and a spring disposed substantially along said median line and connected at one end to said crank and at the other to said vertical member, said spring acting in the same direction to maintain the jaw in set position and also to move the jaw to trapping position; means being provided for enabling adjustment of the height above the surface of the platform of the point of connection of the second-named end of the spring to the vertical member, so as to vary the degree of sensitiveness of the trap.

2. A vermin trap, comprising a base; a tilting platform pivotally mounted thereon and provided with a central longitudinal slot; a vertical bait hook attached to the base and extending upwardly through said slot; a hingedly-mounted, skeleton jaw provided with a central crank and having a restricted rocking movement of 90° slightly past the dead center to bear upon the platform and thereby set the trap; and a spring disposed directly above and in line with the slot and connected at one end to said crank and at the other end to said bait hook.

3. A vermin trap, comprising a base; a tilting platform pivotally mounted thereon and provided with a central longitudinal slot; a vertical bait hook attached to the base and extending upwardly through said slot; a hingedly-mounted, skeleton jaw provided with a central crank and having a restricted rocking movement of 90° slightly past the dead center to bear upon the platform and thereby set the trap; and a spring disposed directly above and in line with the slot and connected at one end to said crank and at the other end to said bait hook; means being provided for enabling adjustment of the height above the surface of the platform of the point of connection of the second-named end of the spring to the bait hook, so as to vary the degree of sensitiveness of the trap.

4. A vermin trap, comprising a base; a tilting platform pivotally mounted thereon and provided with a central longitudinal slot; a vertical bait hook attached to the base and extending upwardly through said slot, said bait hook being provided with a vertical series of notches; a hingedly-mounted, skeleton jaw provided with a central crank and adapted to bear upon the platform and thereby set the trap; and a spring disposed directly above and in line with the slot and connected at one end to said crank, the other end of said spring having a loop which in interchangeably engaged with the notches on the bait hook to adjust the height of the loop above the surface of the platform, so as to vary the sensitiveness of the trap.

In witness whereof we have signed this specification in the presence of two witnesses.

WILLIAM MARK.
FREDERIC JOHN PARKER.

Witnesses:
HARRE BENSON,
GEO. C. BOLTON.